(12) United States Patent
Sisbot et al.

(10) Patent No.: US 12,103,553 B2
(45) Date of Patent: Oct. 1, 2024

(54) OBJECT DETECTION SYSTEM

(71) Applicant: Toyota Motor Engineering & Manufacturing North America, Inc., Plano, TX (US)

(72) Inventors: Emrah Akin Sisbot, Menlo Park, CA (US); Seyhan Ucar, Mountain View, CA (US); Takamasa Higuchi, Mountain View, CA (US); Yongkang Liu, Mountain View, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota Aichi-ken (JP)

( * ) Notice: Subject to any disclaimer, the term of this patent is extended or adjusted under 35 U.S.C. 154(b) by 44 days.

(21) Appl. No.: 17/963,460

(22) Filed: Oct. 11, 2022

(65) Prior Publication Data

US 2024/0116530 A1    Apr. 11, 2024

(51) Int. Cl.
*B60Q 1/00* (2006.01)
*B60K 35/00* (2006.01)
(Continued)

(52) U.S. Cl.
CPC ............ *B60W 50/16* (2013.01); *B60K 35/00* (2013.01); *B60W 40/04* (2013.01); *G06V 20/58* (2022.01); *B60K 35/28* (2024.01); *B60K 35/29* (2024.01); *B60K 2360/176* (2024.01); *B60K 2360/178* (2024.01); *B60K 2360/188* (2024.01); *B60W 2050/0083* (2013.01); *B60W 2050/143* (2013.01); *B60W 2050/146* (2013.01);
(Continued)

(58) Field of Classification Search
CPC ....... B60W 50/16; B60W 40/04; B60K 35/00; B60K 35/28; B60K 35/29; B60K 2360/176; B60K 2360/178; B60K 2360/188; G06V 20/58
USPC ....................................................... 340/435
See application file for complete search history.

(56) References Cited

U.S. PATENT DOCUMENTS

| 5,432,509 | A | * | 7/1995 | Kajiwara | ............... | B60Q 9/008 |
| | | | | | | 340/556 |
| 2015/0002620 | A1 | * | 1/2015 | Shin | .......................... | B60R 1/00 |
| | | | | | | 348/148 |

(Continued)

*Primary Examiner* — Tai T Nguyen
(74) *Attorney, Agent, or Firm* — Christopher G. Darrow; Darrow Mustafa PC

(57) ABSTRACT

An object detection system for a vehicle includes a processor and a memory communicably coupled to the processor. The memory stores instructions that when executed by the processor cause the processor to receive a priority assignment set by an occupant of a vehicle. The priority assignment corresponds to a customization of at least one warning characteristic. The at least one warning characteristic includes a distance threshold. The instructions also cause the processor to detect an object in an external environment of the vehicle and apply the priority assignment to the object. The instructions further cause the processor to issue a warning according to the at least one warning characteristic. According to the distance threshold, the warning is issued when a distance from the vehicle to the object meets the distance threshold.

20 Claims, 10 Drawing Sheets

(51) Int. Cl.
  *B60W 40/04*  (2006.01)
  *B60W 50/16*  (2020.01)
  *G06V 20/58*  (2022.01)
  *B60K 35/28*  (2024.01)
  *B60K 35/29*  (2024.01)
  *B60W 50/00*  (2006.01)
  *B60W 50/14*  (2020.01)

(52) U.S. Cl.
  CPC ... *B60W 2420/403* (2013.01); *B60W 2554/80* (2020.02); *B60W 2556/10* (2020.02)

(56) References Cited

U.S. PATENT DOCUMENTS

| | | | |
|---|---|---|---|
| 2019/0333229 | A1 | 10/2019 | Dane et al. |
| 2019/0389487 | A1* | 12/2019 | Gowda ............... B60Q 1/507 |
| 2020/0104612 | A1 | 4/2020 | Chen et al. |
| 2020/0257907 | A1* | 8/2020 | Kompalli ............. G06V 10/56 |
| 2021/0107505 | A1* | 4/2021 | Matsunaga ........... G01S 15/931 |
| 2021/0209381 | A1* | 7/2021 | Boston ................. B60W 30/08 |
| 2021/0369545 | A1* | 12/2021 | Ghosh ................ G01S 15/526 |
| 2022/0057806 | A1* | 2/2022 | Guo ..................... G06V 20/58 |
| 2022/0118916 | A1 | 4/2022 | Kang |

\* cited by examiner

OBJECT DETECTION SYSTEM

TECHNICAL FIELD

The embodiments disclosed herein relate to an object detection system for a vehicle and, more particularly, to an object detection system for a vehicle that is customizable by an occupant of the vehicle.

BACKGROUND

Some vehicles include object detection systems for detecting one or more objects near the vehicle and providing a warning to an occupant of the vehicle when the vehicle is close to the object. Such object detection systems may use various types of sensors for detecting objects, for example, cameras, SONAR sensors, LIDAR sensors, and/or RADAR sensors that may detect the presence of an object and determine a distance to the object. In some arrangements, these object detection systems can display a live view of the surroundings of the vehicle, including the objects, for example, a live camera view displayed on a user interface of the vehicle. Moreover, these object detection systems can provide information to an occupant of the vehicle about distances between the vehicle and the detected objects.

SUMMARY

Disclosed herein are embodiments of an object detection system for a vehicle and a method of operating an object detection system for a vehicle.

In one aspect, an object detection system is disclosed. The object detection system includes a processor and a memory communicably coupled to the processor. The memory stores instructions that when executed by the processor cause the processor to receive a priority assignment set by an occupant of a vehicle. The priority assignment corresponds to a customization of at least one warning characteristic. The at least one warning characteristic including a distance threshold. The instructions also cause the processor to detect an object in an external environment of the vehicle and apply the priority assignment to the object. The instructions further cause the processor to issue a warning according to the at least one warning characteristic. According to the distance threshold, the warning is issued when a distance from the vehicle to the object meets the distance threshold.

In another aspect, a method for operating an object detection system is disclosed. The method includes receiving a priority assignment set by an occupant of a vehicle. The priority assignment corresponds to a customization of at least one warning characteristic. The at least one warning characteristic includes a distance threshold. The method also includes detecting an object in an external environment of the vehicle and applying the priority assignment to the object. The method further includes issuing a warning according to the at least one warning characteristic. According to the distance threshold, the warning is issued when a distance from the vehicle to the object meets the distance threshold.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches an object detection system for a vehicle. The object detection system is customizable by an occupant of the vehicle through assigning priority to classes of objects, specific objects, and/or object locations. The priority assignment can be set by the occupant using a user interface of the vehicle, and the priority assignment corresponds to a customization of at least one warning characteristic, for example, a distance threshold between the vehicle and the object. Upon the detection of an object in the external environment of the vehicle, the object detection system can classify the object and apply the priority assignment to the object. The object detection system can issue a warning to the occupant about the object according to the warning characteristic, for example, the distance threshold. According to the distance threshold, the warning is issued when the distance between the vehicle and the object meets the distance threshold.

Figure 1:
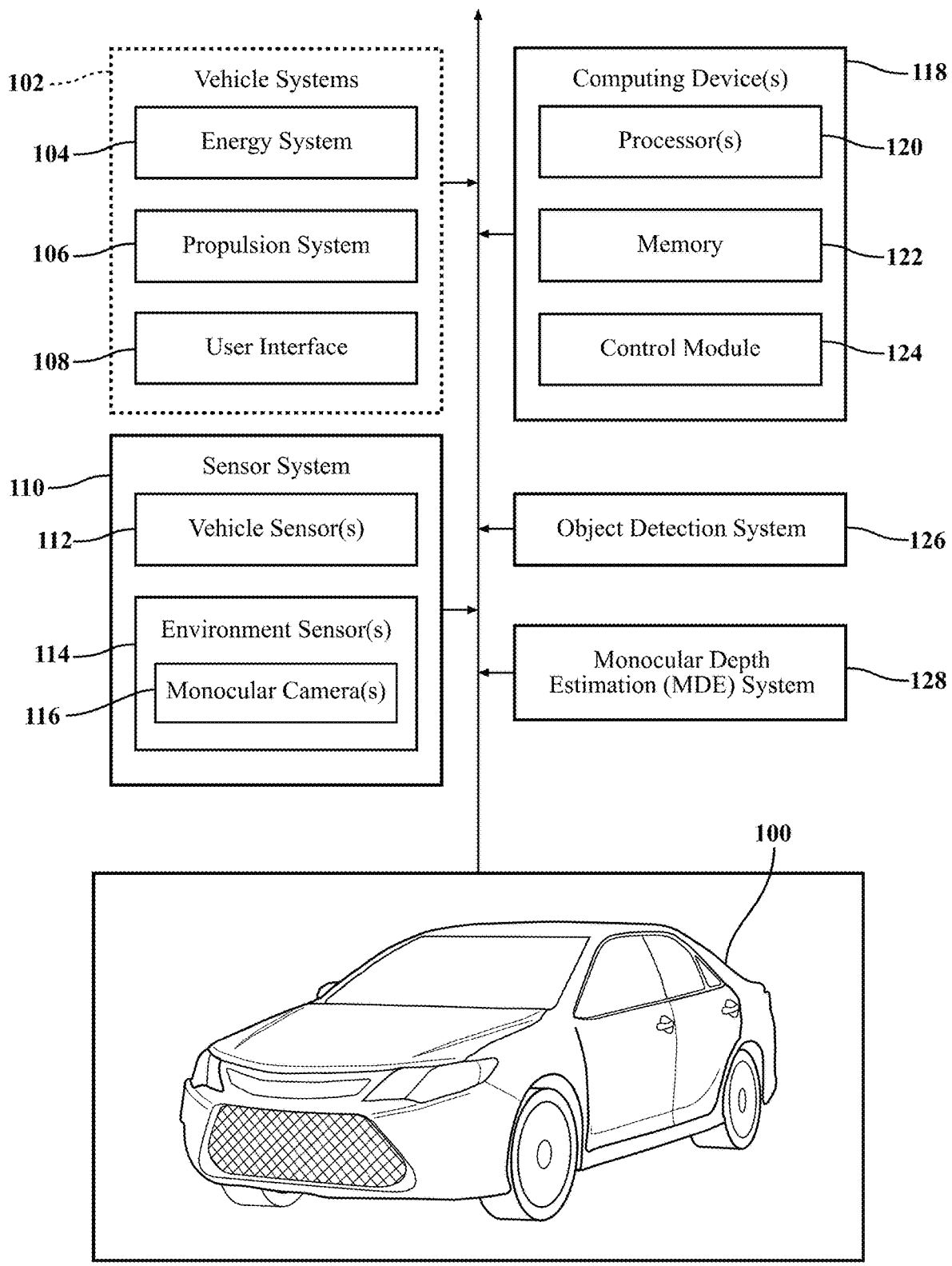
FIG. 1 is an example of a vehicle with an object detection system.

A representative passenger vehicle 100 is shown in FIG. 1. In this description, uses of "front," "forward" and the like, and uses of "rear," "rearward" and the like, refer to the longitudinal directions of the vehicle 100. "Front," "forward," and the like refer to the front (fore) of the vehicle 100, while "rear," "rearward" and the like refer to the back (aft) of the vehicle 100. Uses of "side," "sideways," "transverse" and the like refer to the lateral directions of the vehicle 100, with "driver's side" and the like referring to the left side of the vehicle 100, and "passenger side" and the like referring to the right side of the vehicle 100.

The vehicle 100 includes an exterior and a number of interior compartments. The compartments include a passenger compartment, and an engine compartment. Among other things, the vehicle 100 may include seats, a dash assembly, an instrument panel, controls, and the like housed in the passenger compartment. Additionally, the vehicle 100 may include an engine, a motor, a transmission, and the like, as well as other powertrain components, such as wheels, housed in the engine compartment and elsewhere in the vehicle 100. The wheels support the remainder of the vehicle 100 on the ground. One, some or all of the wheels are powered by the remainder of the powertrain components to drive the vehicle 100 along the ground.

The vehicle 100 includes one or more vehicle systems 102 operable to perform vehicle functions. In addition to the vehicle systems 102, the vehicle 100 includes a sensor system 110 as well as one or more processors 120, a memory 122, and a control module 124 to which the vehicle systems 102 and the sensor system 110 are communicatively connected. The sensor system 110 is operable to detect information about the vehicle 100. The processors 120, the memory 122, and the control module 124 together serve as one or more computing devices 118 whose control module 124 is employable to orchestrate the operation of the vehicle 100, in whole or in part. Specifically, the control module 124 operates the vehicle systems 102 based on information about the vehicle 100. Accordingly, as a prerequisite to operating the vehicle systems 102, the control module 124 gathers information about the vehicle 100, including the information about the vehicle 100 detected by the sensor system 110. The control module 124 then evaluates the information about the vehicle 100 and operates the vehicle systems 102 based on its evaluation.

The vehicle systems 102 are part of, mounted to, or otherwise supported by the body. The vehicle systems 102 may be housed, in whole or in part, in any combination of the passenger compartment, the engine compartment, or elsewhere in the vehicle 100. Each vehicle 100 system includes one or more vehicle elements. On behalf of the vehicle system 102 to which it belongs, each vehicle element is operable to perform, in whole or in part, any combination of vehicle functions with which the vehicle system 102 is associated. It will be understood that the vehicle elements, as well as the vehicle system 102 to which they belong, may but need not be mutually distinct.

The vehicle systems 102 include an energy system 104 and a propulsion system 106. The energy system 104 and the propulsion system 106 are connected to one another. Moreover, the drivetrain is mechanically connected to the propulsion system 106. The propulsion system 106 and the drivetrain together serve as a powertrain for the vehicle 100. The energy system 104 is operable to perform one or more energy functions, including but not limited to storing and otherwise handling energy. The propulsion system 106 is operable to perform one or more propulsion functions using energy from the energy system 104, including but not limited to powering the wheels.

The vehicle systems 102 may also include a user interface 108. The user interface 108 may be any device, component, system, element or arrangement or groups thereof that enable information/data to be entered into a machine by a user. For example, the user interface 108 can be a touch screen mounted to a center console of the vehicle 100. The user interface 108 could also be a user's mobile phone communicatively connected to the vehicle 100. The user interface 108 can receive an input from an occupant, for example, a driver or a passenger of the vehicle 100. Information input to the user interface 108 may be stored by the processor(s) 120 to the memory 122. The user interface 108 can also output information to the user, for example, the occupant of the vehicle 100.

As a part of the sensor system 110, the vehicle 100 includes one or more vehicle sensors 112 and one or more environment sensors 114. The vehicle sensor(s) 112 monitor the vehicle 100 in real-time. The vehicle sensor(s) 112, on behalf of the sensor system 110, are operable to detect information about the vehicle 100, including information about user requests and information about the operation of the vehicle 100. For example, the vehicle sensor(s) 112 can be configured to detect and/or acquire data about various operating parameters of the vehicle 100. For example, the vehicle sensor(s) 112 can include one or more speedometers, one or more gyroscopes, one or more accelerometers, one or more inertial measurement units (IMUs), one or more wheel sensors, one or more steering angle sensors, one or more controller area network (CAN) sensors, and the like. Relatedly, among information about the operation of the vehicle 100, the sensor system 110 is operable to detect the location and motion of the vehicle 100, including its speed, acceleration, orientation, rotation, direction, and the like, the movement of the wheels, the steering angle, and the operational statuses of one, some, or all of the vehicle systems 102.

The environment sensor(s) 114 can be configured to detect, determine, assess, monitor, measure, quantify, acquire, and/or sense data or information about the external environment in which the vehicle 100 is located or one or more portions thereof. The environment sensor(s) 114 can include one or more exterior cameras and one or more exterior sensors, such as temperature sensor, weather sensors, LIDAR, RADAR, etc. The exterior cameras can include one or more monocular cameras 116. The environment sensor(s) 114 can be located on an exterior of the vehicle 100 or can be located in any other suitable location on the vehicle 100. Using the environment sensor(s) 114, the vehicle systems 102 can determine information about the external environment of the vehicle 100. For example, the vehicle systems 102 can detect one or more objects in the external environment of the vehicle 100.

The vehicle systems 102, the sensor system 110, the processor(s) 120, the memory 122, and the control module 124 may be leveraged to implement an object detection system 126. In the vehicle 100, the vehicle systems 102, the sensor system 110, the processor(s) 120, the memory 122, and the control module 124 leveraged to implement the object detection system 126 may be part of one or more other control systems typical of vehicles or may be dedicated to the object detection system 126.

The object detection system 126 may be configured to detect one or more objects near the vehicle 100 and issue warnings to an occupant of the vehicle 100 based on the distance between the vehicle 100 and the object(s). The occupant may be a driver of the vehicle 100 or another passenger of the vehicle 100. In some arrangements, the object detection system 126 can display the external environment of the vehicle 100 in grayscale, while displaying the detected objects in color. The object detection system 126 may issue the warnings according to a set of default warning characteristics. The default warning characteristics may be warning characteristics setup by the manufacturer of the vehicle 100. The default warning characteristics may include a distance threshold between the vehicle 100 and a detected object. More specifically, the object detection system 126 may issue a warning upon the detection of an object near the vehicle 100 when the distance threshold is met. For example, the distance threshold may be 10 feet and the object detection system 126 may issue a warning upon the detection of an object near the vehicle 100 when the vehicle 100 is about 10 feet or less from the object. The default warning characteristics may be stored by the processor(s) 120 to the memory 122 and/or received by the processor(s) 120 from the memory 122.

The warning characteristics may be customizable by the occupant in one or more ways. For example, the occupant may customize the warning characteristics by assigning a priority to the objects detected by the object detection system 126. The priority assignment corresponds to a customization of the warning characteristics. Accordingly, based on the priority assignment, the object detection system 126 may change one or more of the warning characteristics. The occupant can make the priority assignments through the user interface 108 and the priority assignments can be received by the processor(s) 120. The priority assignments may include a range of priority assignments from lower priority to higher priority. The occupant may want to assign a lower priority to objects that, upon collision, would not significantly damage the vehicle 100 or pose a threat to the object. For example, the occupant may want to assign a lower priority to objects such as tree branches, debris, curbs, speed bumps, etc. On the other hand, the occupant may want to assign a higher priority to objects that, upon collision, would significantly damage the vehicle 100 or threaten the object. For example, the occupant may want to assign a higher priority to objects such as nearby vehicles, walls and/or barricades, pedestrians and/or bicyclists, shopping carts, trees, etc.

The warning characteristics may include, and the priority assignment may thus correspond to a customization of, a distance threshold upon which the warning is based. For example, as the priority increases from lower priority to higher priority, the distance threshold may also increase. More specifically, a lower priority assignment may correspond to a lower distance threshold, and a higher priority assignment may correspond to a higher distance threshold. Therefore, when the object detection system 126 detects a lower priority object, the object detection system 126 may be configured to issue a warning to the occupant when the vehicle 100 is relatively close to the object. On the other hand, when the object detection system 126 detects a higher priority object, the object detection system 126 may be configured to issue a warning to the occupant when the vehicle 100 is farther away from the object.

In some arrangements, the occupant may make these priority assignments during an initial setup process of the vehicle 100. During initial setup, it may be advantageous to make global priority assignments based on one or more classifications of objects that the object detection system 126 may be configured to detect. For example, the occupant may assign a different priority for tree branches, nearby vehicles, debris, pedestrians, speed bumps, curbs, and any other object classification. For example, the occupant may assign a low priority for all tree branches, high priority for all nearby vehicles, low priority for all debris, high priority for all pedestrians, etc.

Figure 2:
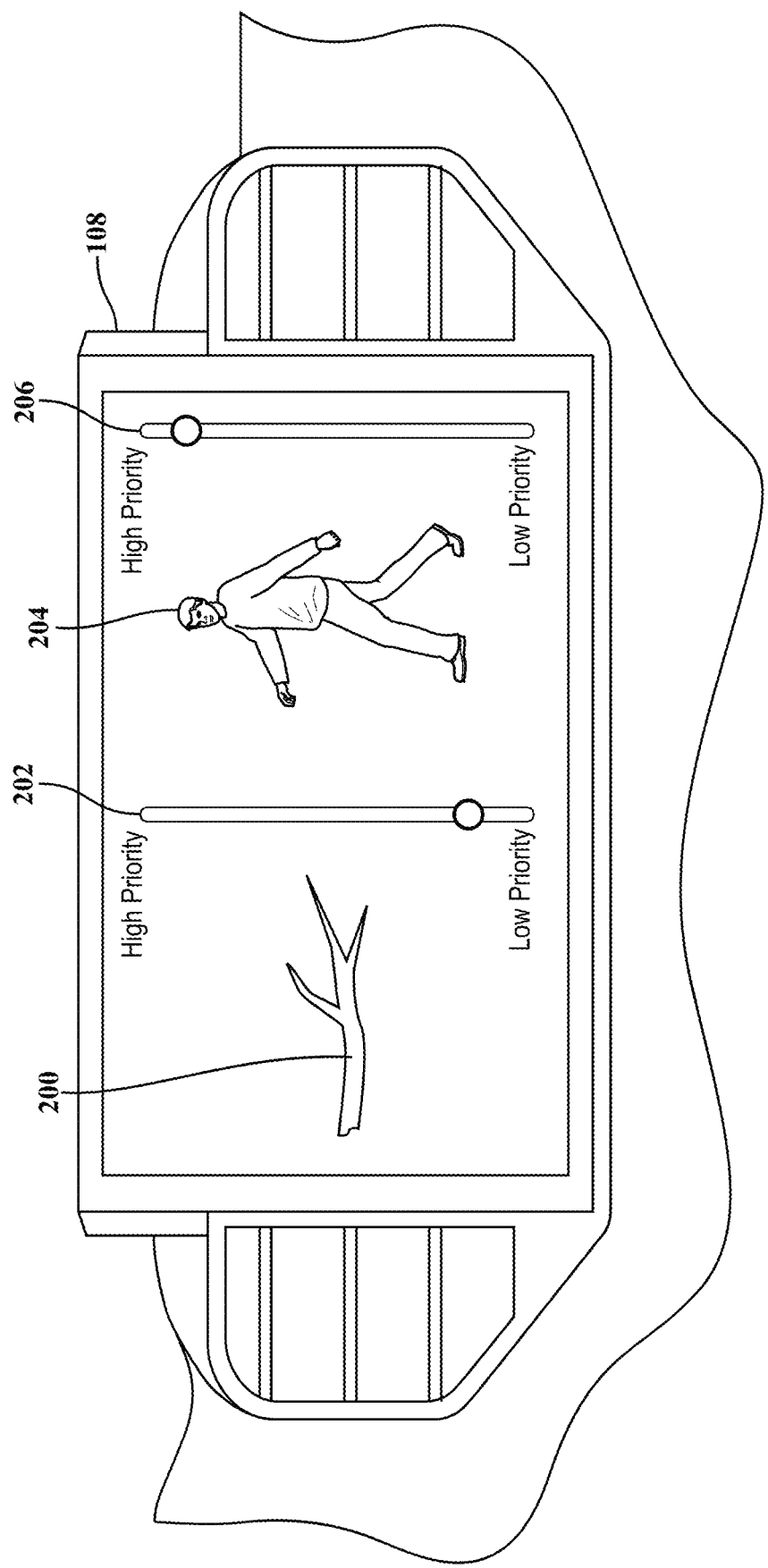
FIG. 2 is an example of a user interface of the vehicle that an occupant can use to customize one or more warning characteristics of the object detection system by assigning a priority to one or more classes of objects.

The occupant can make the priority assignments using the user interface 108 in any suitable configuration. In one example, the user interface 108 can display one or more classes of objects next to a slider icon. The occupant can use the slider icon to set the priority assignment for a class of object. For example, as shown in FIG. 2, the user interface 108 shows a tree branch 200 and a first slider icon 202 for setting the priority of the tree branch 200. If the occupant sets the priority of the tree branch 200 to a low priority assignment, the object detection system 126 will apply a low priority assignment to other detected tree branches. More specifically, when the object detection system 126 detects an object, the object detection system 126 will classify the object. When the class of the object is a tree branch, the object detection system 126 will match the object to a low priority assignment and issue warnings about the tree branch based on the low priority assignment. Similarly, the user interface 108 also shows a pedestrian 204 and a second slider icon 206 for setting the priority of the pedestrian 204. If the occupant sets the priority of the pedestrian 204 to a high priority assignment, the object detection system 126 will apply a high priority assignment to other detected pedestrians. More specifically, when the object detection system 126 detects an object, the object detection system 126 will classify the object. When the class of the object is a pedestrian, the object detection system 126 will match the object to a high priority assignment and issue warnings about the pedestrian based on the high priority assignment.

Figure 3A:
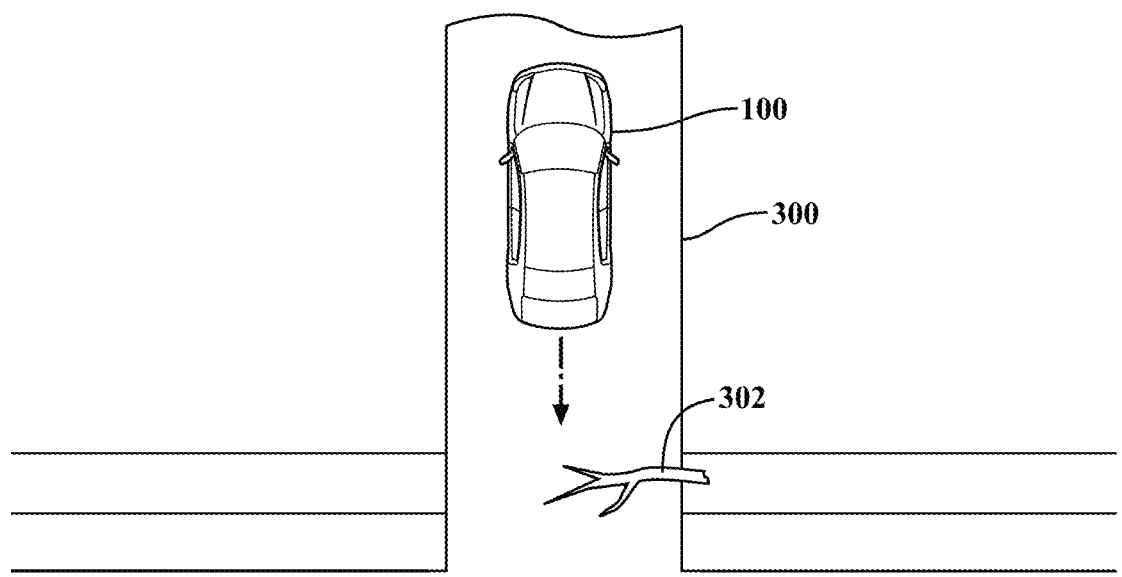
FIG. 3A is an example of the vehicle backing out of a driveway with an object in the driveway detected by the object detection system.
Figure 3B:
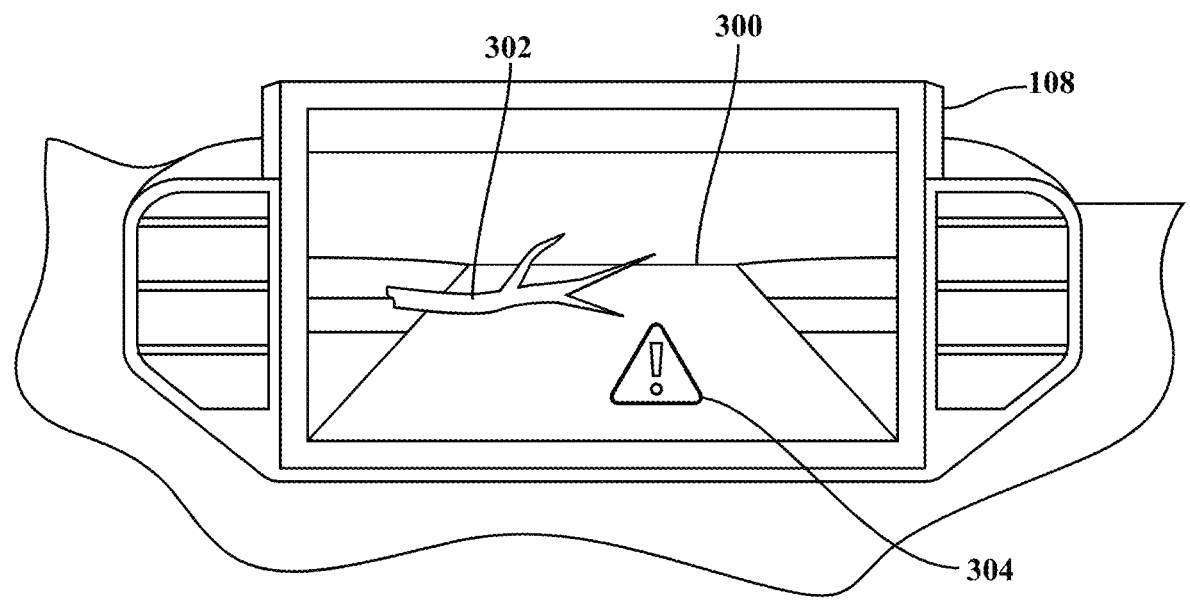
FIG. 3B is an example of a warning issued by the object detection system regarding the object detected in FIG. 3A.

Other illustrated examples of the object detection system 126 are shown in FIGS. 3A-3B, 4A-4C, and 5. In these and other examples, the object detection system 126 may be advantageous during parking of the vehicle 100. For example, the occupant may find the object detection system 126 particularly advantageous when parking the vehicle 100 near objects such as sign posts, curbs, bushes, etc., and even when parking the vehicle 100 in their own home garage, as described in further detail below. The object detection system 126 is also advantageous during regular driving or reversing of the vehicle 100. For example, referring to FIG. 3A, the vehicle 100 is shown reversing out of a driveway 300. The object detection system 126 may detect an object 302 in the driveway 300, classify the object 302 as a tree branch 302, and determine that the priority assignment for tree branches is low. As shown in FIG. 3B, the object detection system 126 may issue a warning to the occupant when the vehicle 100 is relatively close to the tree branch 302. The warning can be a visual warning, for example, a warning icon 304 on the user interface 108, as shown, and can include an audial warning and/or a haptic warning. In some instances, the warning can include displaying the environment in grayscale while displaying the tree branch 302 in color.

Figure 4A:
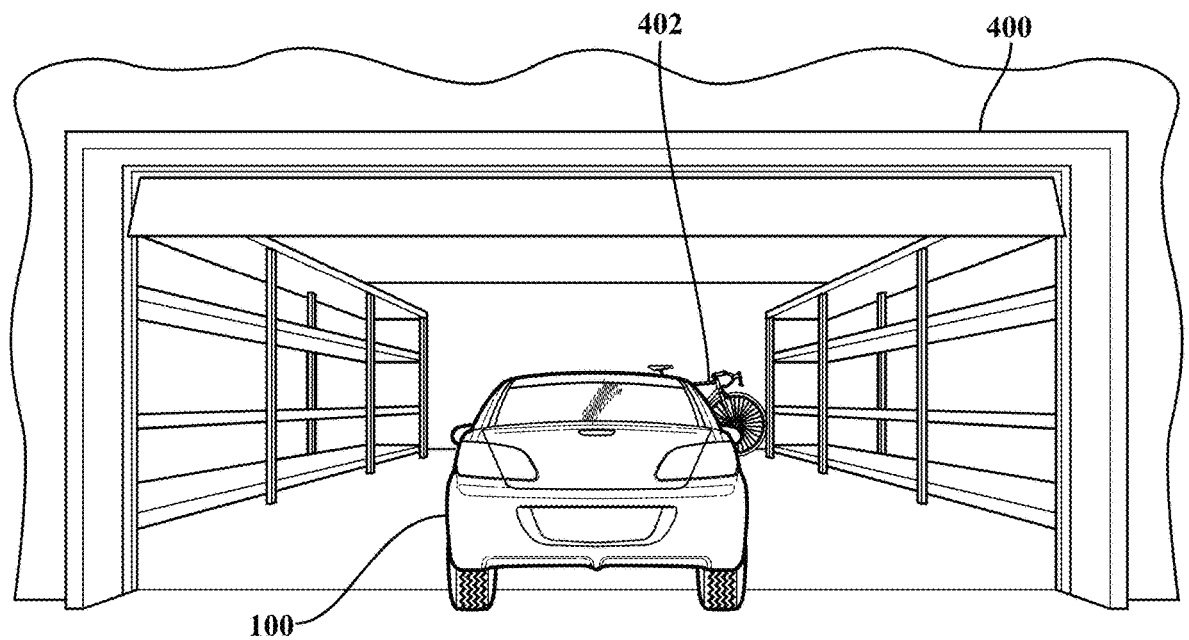
FIG. 4A is an example of the vehicle parking in a home garage with an object in the home garage detected by the object detection system.
Figure 4B:
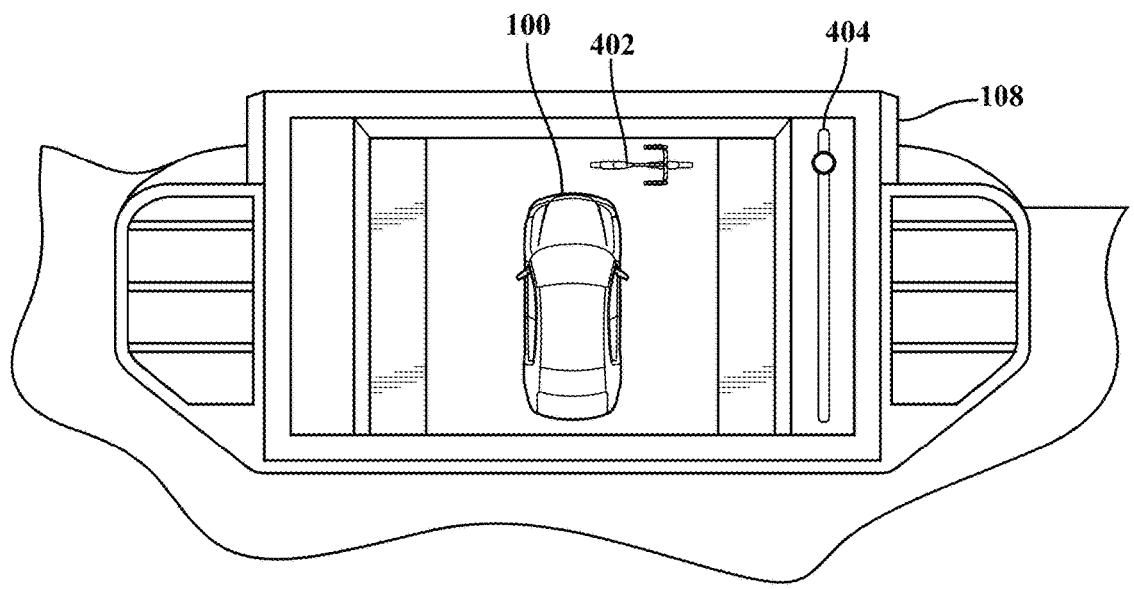
FIG. 4B is an example of a priority assignment for the object detected in FIG. 4A.
Figure 4C:
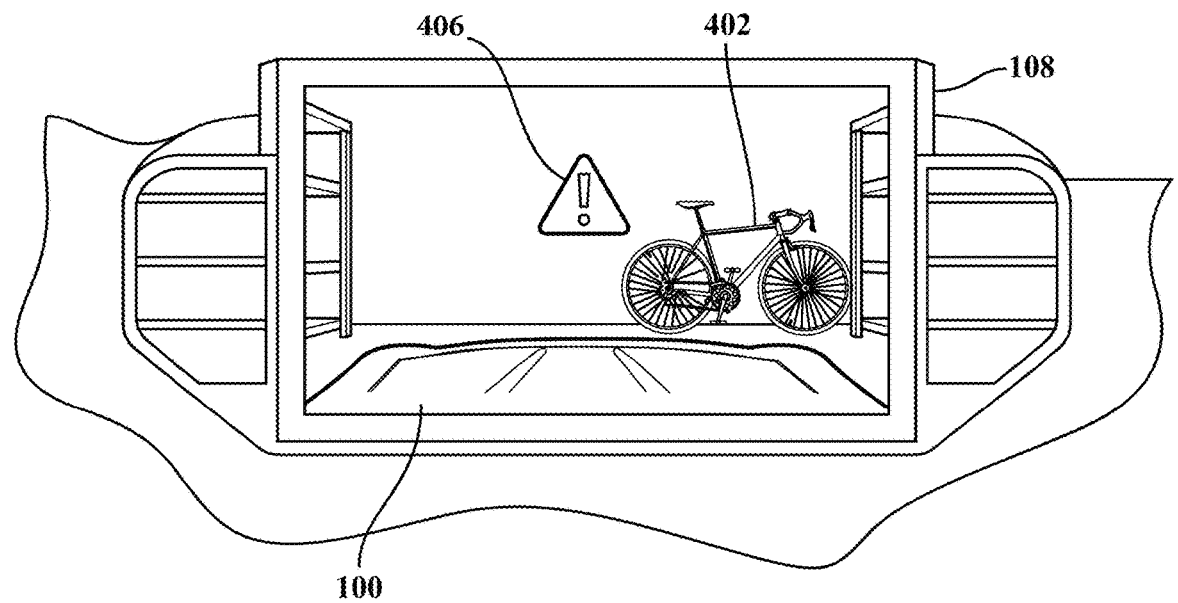
FIG. 4C is an example of a warning issued by the object detection system regarding the object detected in FIG. 4A.

In some instances, the occupant may want to make a priority assignment for a specific object. For example, with reference to FIG. 4A, the occupant may want to pay special attention to an object in a home garage 400, for example, a bicycle 402 stored in the home garage 400 ahead of the vehicle 100. FIG. 4A shows the vehicle 100 parking in the home garage 400, and FIG. 4B shows an overhead view of the vehicle 100 parking in the home garage 400 on the user interface 108. In some examples, the occupant may be able to select a specific object and set the priority for the object. For example, referring to FIG. 4B, the occupant can select the bicycle 402, and the priority assignment can be made using a slider icon 404. Once the priority assignment is set, referring now to FIG. 4C, the object detection system 126 may issue a warning to the occupant based on the specific priority assignment. For example, if the occupant designates the bicycle 402 as high priority, the object detection system 126 can issue the warning when the vehicle 100 is relatively far from the bicycle 402. The warning can be a visual warning, for example, a warning icon 406 on the user interface 108, as shown, and can include an audial warning and/or a haptic warning. In some instances, the warning can include displaying the environment in grayscale while displaying the bicycle 402 in color.

Figure 5:
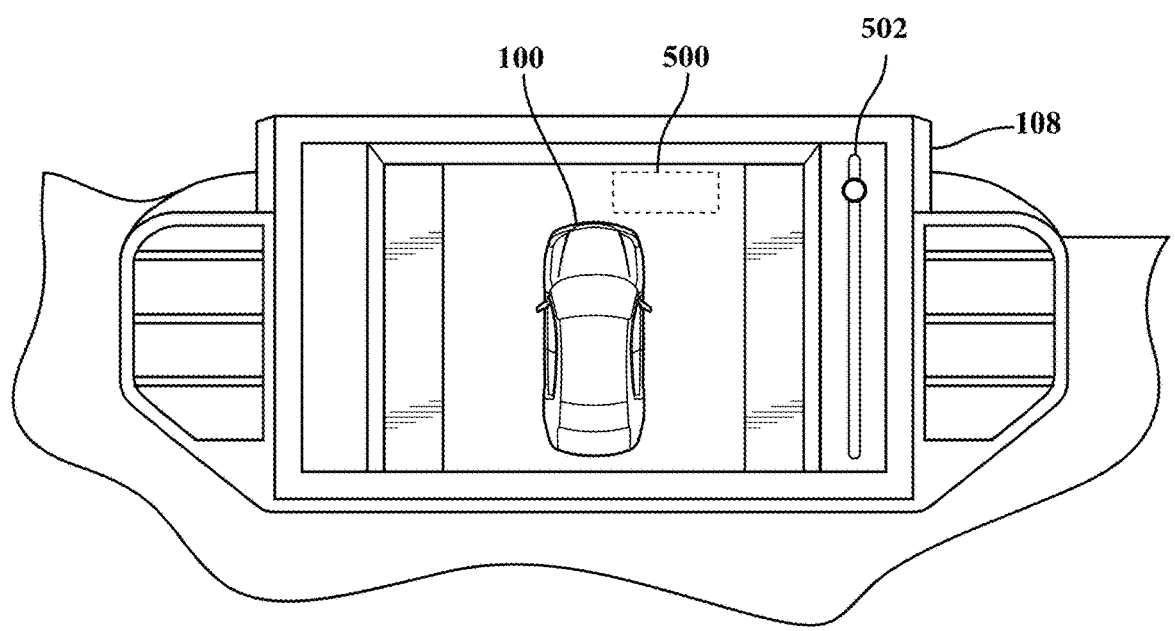
FIG. 5 is an example of a priority assignment for an object location.

Thus, in addition to or alternatively from making priority assignments based on object classifications, an occupant may make priority assignments on an object-by-object basis. This may also be advantageous for various objects that may not be able to be classified by the object detection system 126. For example, an occupant may be parking in their home garage in which they are storing a china cabinet that is not classifiable by the object detection system 126. The occupant may assign a high priority to the china cabinet to ensure that the vehicle 100 does not come close to it. Moreover, in some instances, the occupant may want to make a priority assignment for a specific object location. Referring to FIG. 5, the occupant can select a specific object location 500 on the user interface 108. The priority assignment can be set for the specific object location 500 using a slider icon 502.

As mentioned above, in any of the above-described examples, the warning issued by the object detection system 126 can be a visual warning, for example, a warning icon on the user interface 108, and can include an audial warning and/or a haptic warning. Accordingly, the warning characteristics may include, and the priority assignment may thus correspond to a customization of, a warning type, a warning intensity, and a warning location. The warning type may be an audial warning (e.g., a beep), a visual warning (e.g., a flashing light or an image displayed on the user interface 108), and/or a haptic warning (e.g., a vibration through the steering wheel). Regarding an audial warning, the warning intensity may be a volume of the warning, for example, a quieter warning for a lower priority assignment and a louder warning for a higher priority assignment. Regarding a visual warning, the warning intensity may be a brightness of the warning, for example, a dimmer flashing light for a lower priority assignment and a brighter flashing light for a higher priority assignment.

The warning intensity may alternatively be a size of the visual warning, for example, a smaller image for a lower priority assignment and a larger image for a higher priority assignment. Regarding a haptic warning, the warning intensity may be a strength of the vibration, for example, a weaker vibration for a lower priority assignment and a stronger vibration for a higher priority assignment. Regarding an audial warning, the warning location may be a speaker located in the center of the vehicle 100 (e.g., in connection with the user interface 108) or a speaker located on the driver's side of the vehicle 100. Regarding a visual warning, the warning location may be a screen behind the steering wheel, a screen located in the center of the vehicle 100 (e.g., the user interface 108), a heads-up display on the windshield, etc. Regarding a haptic warning, the warning location may be the steering wheel, the seat, etc.

In some instances, the object detection system 126 may be able to predict the priority assignment of an object based on historical data of an occupant's past priority assignments. The historical data may be a database of past priority assignments made by the occupant. For example, if the historical data indicates that the occupant designates all tree branches as lower priority, the object detection system 126 may be able to infer that the occupant does not care about driving over tree branches, and thus can designate future-detected tree branches as lower priority. On the other hand, if the historical data indicates that the occupant designates small tree branches as lower priority and big tree branches as higher priority, the object detection system 126 may be able to infer that the occupant does not want to drive over bigger tree branches (for example, if the occupant does not want their car damaged) and thus designate future-detected, larger tree branches as higher priority.

In another example, the object detection system 126 can learn the occupant's preferences based on the direction in which the vehicle 100 is traveling. For example, in some instances, the occupant may not want early warnings about objects in front of the vehicle 100 when driving forward, and the object detection system 126 can designate objects in front of the vehicle 100 when driving forward as lower priority. On the other hand, if the occupant wants early warnings when driving in reverse, the object detection system 126 can designate objects behind the vehicle 100 when reversing as higher priority. As the object detection system 126 correctly predicts priority assignments, the object detection system 126 can add the priority assignments to the database. The database can be stored in the memory 122.

In some arrangements, the object detection system 126 may detect one or more objects using a depth map generated based on a monocular camera image. Accordingly, referring back to FIG. 1, the vehicle systems 102, the sensor system 110, the processor(s) 120, the memory 122, and the control module 124 may be leveraged to implement a monocular depth estimation (MDE) system 128. In the vehicle 100, the vehicle systems 102, the sensor system 110, the processor(s) 120, the memory 122, and the control module 124 leveraged to implement the MDE system 128 may be part of one or more other control systems typical of vehicles or may be dedicated to the MDE system 128. The MDE system 128 will be described in further detail below in connection with the monocular camera image 600 of FIG. 6A and the depth map 602 of FIG. 6B. The MDE system 128 may be configured to generate a depth map 602 of at least a portion of the external environment of the vehicle 100 based on information received from the sensor system 110. More specifically, the MDE system 128 may be configured to generate the depth map 602 based, at least in part, on information received by one or more monocular cameras 116 mounted to the vehicle 100. The depth map 602 may then be used as an input to other vehicle systems 102, for example, the object detection system 126, as described in further detail below.

Figure 6A:
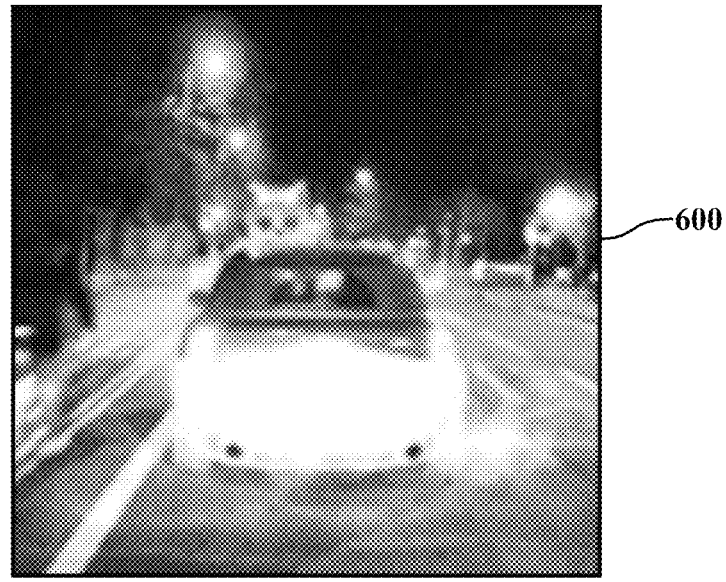
FIG. 6A is an example of a monocular camera image captured by a monocular camera mounted to the vehicle.
Figure 6B:
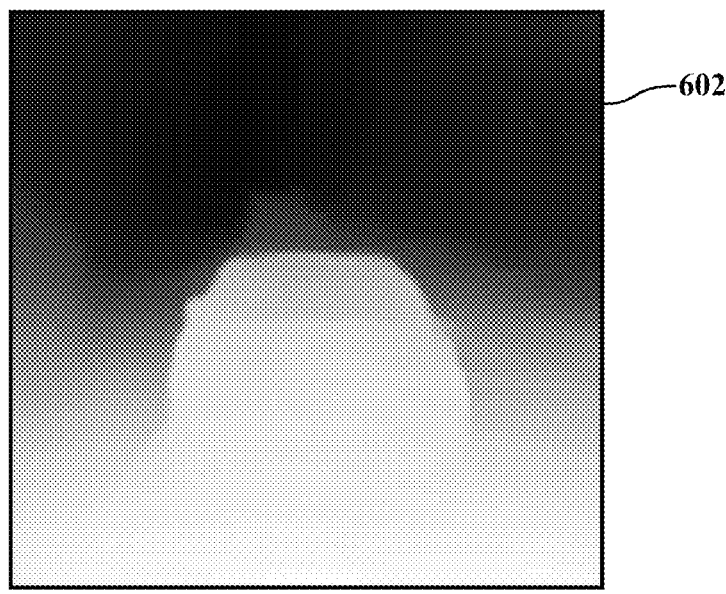
FIG. 6B is an example of a depth map generated based on the monocular camera image of FIG. 5A.

As mentioned above, the vehicle 100 may include one or more monocular cameras 116 mounted to the exterior of the vehicle 100 at the front of the vehicle 100 or at the rear of the vehicle 100, inside the vehicle 100, and/or at any other location on the vehicle 100. The monocular camera(s) 116 are configured to capture one or more monocular camera images 600 of an external environment of the vehicle 100. Referring now to FIG. 6A, an example of a monocular camera image 600 is shown. The monocular camera image 600 shows a view of a preceding vehicle traveling directly ahead of the vehicle 100. The monocular camera image 600 may be a color image typical of other types of vehicle-mounted cameras. Referring now to FIG. 6B, an example of a depth map 602 is shown. The depth map 602 is a monochrome image based on the monocular camera image 600. The pixel values of the depth map 602 are proportional to the distance between the monocular camera 116 and the object in the monocular camera image 600. As shown, the pixel values of the depth map 602 are proportional to the distance between the monocular camera 116 and the preceding vehicle 100. The object detection system 126 may use the depth map 602 to identify objects near the vehicle 100.

Figure 7:
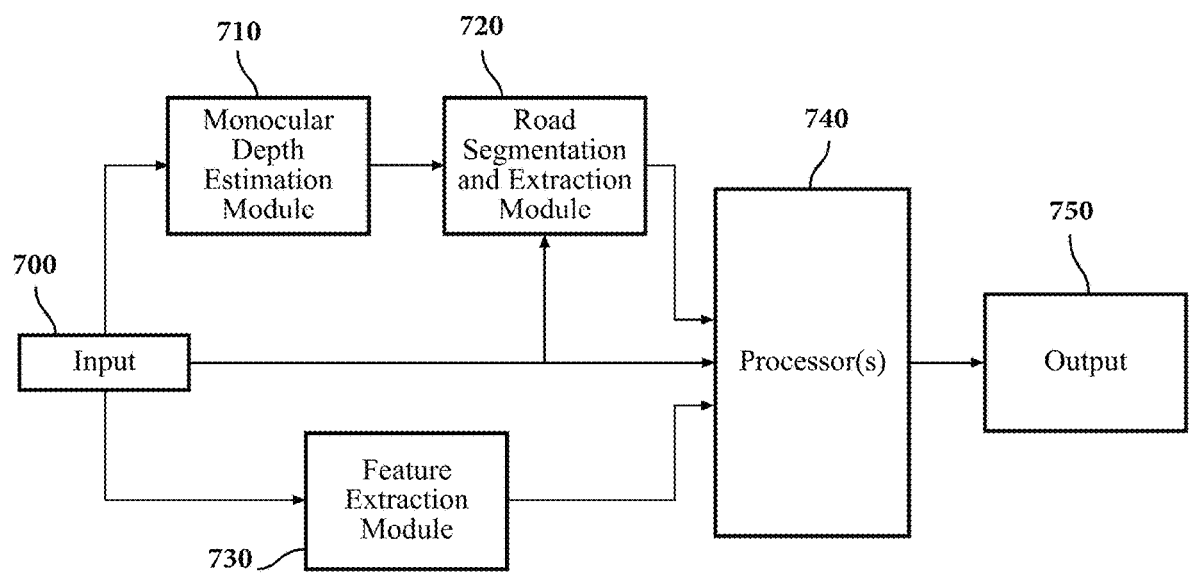
FIG. 7 is an example of a monocular depth estimation system.

Referring now to FIG. 7, the MDE system 128 is shown. The MDE system 128 may be configured to receive an input 700 and generate an output 750. The input 700 may be the monocular camera image 600. The monocular camera image 600 can be a color image taken by a monocular camera 116. The output 750 can be the identification of one or more objects, for example, one or more objects in an external environment of the vehicle 100. The MDE system 128 includes a monocular depth estimation (MDE) module 710, a road segmentation and extraction (RSE) module 720, a feature extraction module 730, and one or more processor(s) 740. The processor(s) 740 may be the processor(s) 120 of FIG. 1 or any other suitable processor(s). The MDE module 710, the RSE module 720, and/or the feature extraction module 730 can be components of the processor(s) 740 or may be components of one or more other processors. The MDE module 710 is configured to receive the input 700 (i.e., the monocular camera image 600) and generate a depth map 602 using machine learning or any other suitable method. As described above, the depth map 602 is a grayscale image in which each pixel value is proportional to the distance to the monocular camera 116. The RSE module 720 is configured to receive the monocular camera image 600 and/or the depth map 602 and detect, segment out, and extract the part of the monocular camera image 600 and/or the depth map 602 corresponding to the road. The feature extraction module 730 may receive the input 700 and may be configured to detect features (e.g., objects) in the monocular camera image 600. The processor(s) 740 may function as a decision system based on the input 700 (i.e., the monocular camera image 600), the depth map 602, the road, and/or the features to generate the output 750. The output 750 may be the detection of one or more objects in the external environment of the vehicle 100.

With reference one again to FIG. 1, as noted above, the processor(s) 120, the memory 122, and the control module 124 together serve as the computing device(s) 118 whose control module 124 orchestrates the operation of the vehicle 100, including but not limited to the operation of the vehicle systems 102. The control module 124 may be a dedicated control module for the object detection system 126 and/or the MDE system 128. Relatedly, as part of a central control system, the vehicle 100 may include a global control unit (GCU) to which the control module 124 is communicatively connected. Alternatively, the control module 124 may be a global control module. Relatedly, as part of a central control system, the vehicle 100 may include a global control unit (GCU) to which the control module 124 belongs. Although the vehicle 100 as shown includes one control module 124, it will be understood that this disclosure is applicable in principle to otherwise similar vehicles including multiple control modules. Moreover, although the control module 124 is shown as part of the vehicle 100, it will be understood that the control module 124 may be located offboard the vehicle 100.

The processors 120 may be any components configured to execute any of the processes described herein or any form of instructions to carry out such processes or cause such processes to be performed. The processors 120 may be implemented with one or more general-purpose or special-purpose processors. Examples of suitable processors include microprocessors, microcontrollers, digital signal processors, or other forms of circuitry that execute software. Other examples of suitable processors include, without limitation, central processing units (CPUs), array processors, vector processors, digital signal processors (DSPs), field programmable gate arrays (FPGAs), programmable logic arrays (PLAs), application specific integrated circuits (ASICs), programmable logic circuitry, or controllers.

The processors 120 may include at least one hardware circuit (e.g., an integrated circuit) configured to carry out instructions contained in program code. In arrangements where there are multiple processors, the processors may work independently from each other or in combination with one another. Moreover, although the processors 120 are shown as part of the vehicle 100, it will be understood that the processors 120 may be located offboard the vehicle 100. The memory 122 is a non-transitory computer readable medium. The memory 122 may include volatile or nonvolatile memory, or both.

Examples of suitable memory include random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination of these. The memory 122 includes stored instructions in program code. Such instructions are executable by the processors 120 or the control module 124. The memory 122 may be part of the processors 120 or the control module 124 or may be communicatively connected to the processors 120 or the control module 124. Generally speaking, the control module 124 includes instructions that may be executed by the processors 120. The control module 124 may be implemented as computer readable program code that, when executed by the processors 120, executes one or more of the processes described herein. Such computer readable program code may be stored in the memory 122. The control module 124 may be part of the processors 120 or may be communicatively connected to the processors 120.

Now that the various potential systems, devices, elements, and/or components have been described, various methods, including various possible steps of such methods, will now be described. The methods described may be applicable to the arrangements described above, but it is to be understood that the methods can be carried out with other suitable systems and arrangements. The methods may include other steps not shown here, and the methods are not limited to including every step shown. The blocks illustrated here as part of the methods are not limited to the particular chronological order. Indeed, some of the blocks may be performed in a different order than what is shown and/or at least some of the blocks shown can occur simultaneously.

Figure 8:
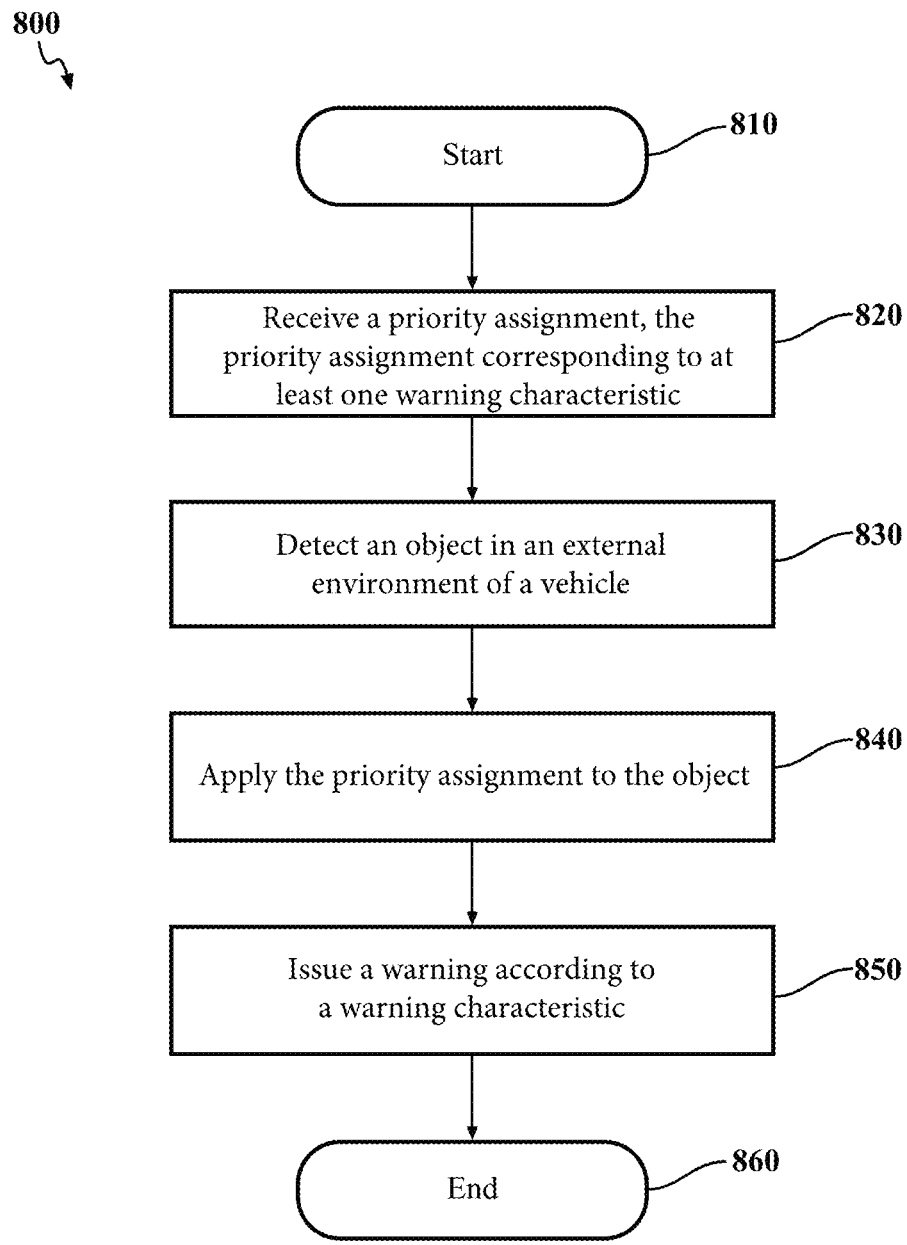
FIG. 8 is an example of a method of operating the object detection system.

Referring to FIG. 8, an example of operating the object detection system 126 is shown. The method 800 may begin in operation 810. In operation 820, the method 800 may include receiving a priority assignment set by an occupant of the vehicle 100. The priority assignment corresponds to a customization of at least one warning characteristic. The warning characteristic includes a distance threshold. In operation 830, the method 800 includes detecting an object in an external environment of the vehicle 100. In operation 840, the method 800 includes applying the priority assignment to the object. In operation 850, the method 800 includes issuing a warning according to the warning characteristic. According to the distance threshold, the warning is issued when a distance from the vehicle 100 to the object meets the distance threshold. The method 800 may end in operation 860.

Figure 9:
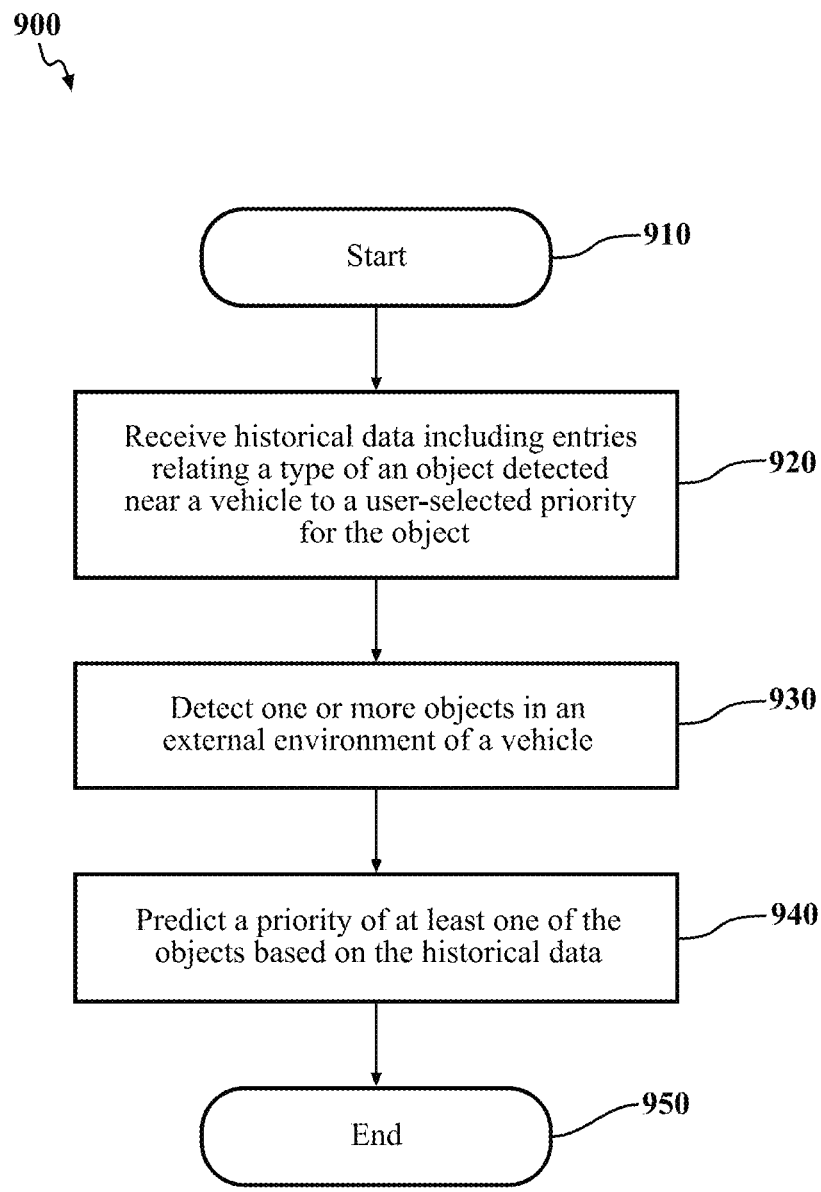
FIG. 9 is an example of a method of predicting a priority assignment of an object based on historical data.

Referring to FIG. 9, an example of a method 900 of predicting a priority assignment for an object detected near the vehicle 100 is shown. The method 900 begins in operation 910. In operation 920, the method 900 includes receiving historical data including entries relating a type of an object detected near the vehicle 100 to an occupant-selected priority for the object. In operation 930, the method 900 includes detecting one or more objects in an external environment of the vehicle 100. In operation 940, the method 900 includes predicting a priority assignment of at least one of the objects based on the historical data. The method 900 may end in operation 950.

Figure 10:
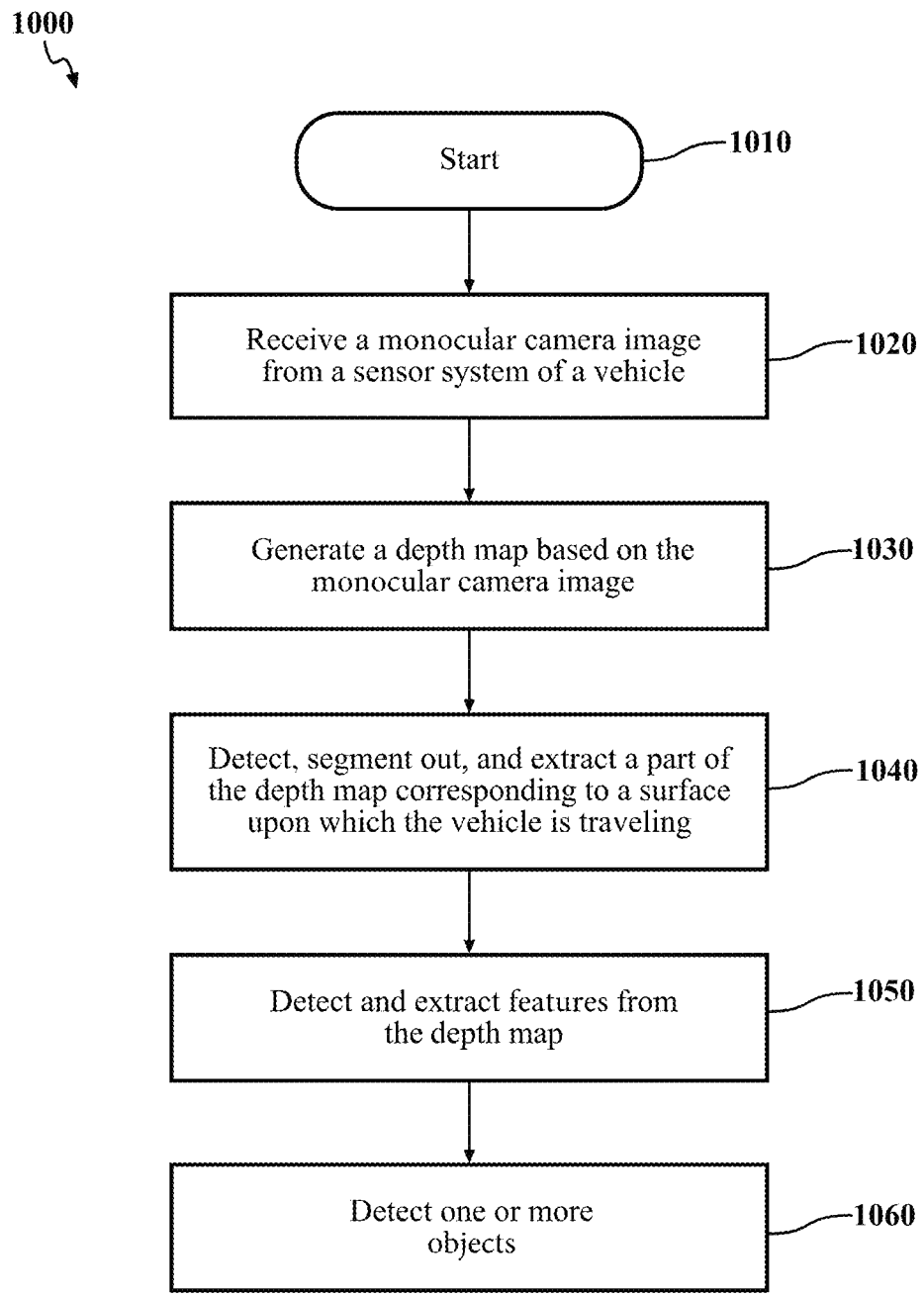
FIG. 10 is an example of a method of detecting one or more objects using a depth map.

Referring to FIG. 10, an example of a method 1000 of detecting one or more objects is shown. The method 1000 may begin in operation 1010. In operation 1020, the method 1000 may include receiving a monocular camera image 600 from the sensor system 110 of the vehicle 100. In operation 1030, the method 1000 may include generating a depth map 602 based on the monocular camera image 600. The depth map 602 may be a grayscale image in which each pixel value is proportional to the distance to the monocular camera 116. In operation 1040, the method 1000 may include, based on the monocular camera image 600 and/or the depth map 602, detecting, segmenting out, and extracting a part of the depth map 602 corresponding to a surface upon which the vehicle 100 is traveling. In operation 1050, the method 1000 may include, based on the monocular camera image 600 and/or the depth map 602, detecting and extracting features. For example, the method 1000 may include detecting one or more objects based on the monocular camera image 600 and/or the depth map 602. In operation 1060, the method 1000 may include detecting one or more objects in the external environment of the vehicle 100.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An object detection system, comprising:
   a processor; and
   a memory communicably coupled to the processor and storing instructions that when executed by the processor cause the processor to:
      receive a priority assignment set by an occupant of a vehicle, the priority assignment corresponding to a customization of at least one warning characteristic, the at least one warning characteristic including a distance threshold;
      detect an object in an external environment of the vehicle;
      classify the object to identify an object classification;
      apply the priority assignment to the object based on the object classification; and
      issue a warning according to the at least one warning characteristic, wherein according to the distance threshold, the warning is issued when a distance from the vehicle to the object meets the distance threshold.

2. The object detection system of claim 1, wherein the priority assignment is set for an object classification according to an input from a slider icon displayed on a user interface of the vehicle, and wherein the instructions further cause the processor to apply the priority assignment to the object when the object falls within the object classification.

3. The object detection system of claim 2, wherein the object classification is at least one of trees, tree branches, speed bumps, debris, curbs, walls, barricades, vehicles, pedestrians, bicyclists, and shopping carts.

4. The object detection system of claim 1, wherein the priority assignment is set by the occupant for a specific object, and wherein the instructions further cause the processor to apply the priority assignment to the object when the object is the specific object.

5. The object detection system of claim 1, wherein the priority assignment is set by the occupant for an object location, and wherein the instructions further cause the processor to apply the priority assignment to the object when the object is in the object location.

6. The object detection system of claim 1, wherein the priority assignment is a priority assignment in a range of priority assignments from lower priority to higher priority, and wherein the distance threshold increases as the priority assignment increases from lower priority to higher priority.

7. The object detection system of claim 1, wherein the instructions further cause the processor to create a database of historical data having entries relating an object classification to a priority assignment, and wherein the instructions further cause the processor to predict the priority assignment of a detected object based on the historical data.

8. The object detection system of claim 1, wherein the priority assignment modifies default warning characteristics of the object detection system according to the classification, and wherein the default warning characteristics include at least one of a warning type, a warning intensity, and a warning location.

9. The object detection system of claim 1, wherein the instructions further cause the processor to display the external environment of the vehicle in greyscale, and wherein issuing the warning includes displaying the object in color.

10. The object detection system of claim 1, wherein the instructions further cause the processor to:
   detect the object using at least one monocular camera image obtained by a monocular camera mounted to the vehicle; and
   determine the distance from the vehicle to the object using a depth map generated based on the at least one monocular camera image.

11. A method for operating an object detection system, the method comprising:
   receiving a priority assignment set by an occupant of a vehicle, the priority assignment corresponding to a customization of at least one warning characteristic, the at least one warning characteristic including a distance threshold;
   detecting an object in an external environment of the vehicle;
   classifying the object to identify an object classification;
   applying the priority assignment to the object based on the object classification; and
   issuing a warning according to the at least one warning characteristic, wherein according to the distance threshold, the warning is issued when a distance from the vehicle to the object meets the distance threshold.

12. The method of claim 11, wherein receiving a priority assignment includes receiving a priority assignment set for an object classification according to an input from a slider icon displayed on a user interface of the vehicle, and wherein applying the priority assignment to the object includes applying the priority assignment to the object when the object falls within the object classification.

13. The method of claim 12, wherein the object classification is at least one of trees, tree branches, speed bumps, debris, curbs, walls, barricades, vehicles, pedestrians, bicyclists, and shopping carts.

14. The method of claim 11, wherein receiving a priority assignment set by an occupant of a vehicle includes receiving a priority assignment set by the occupant for a specific object, and wherein applying the priority assignment to the object includes applying the priority assignment to the object when the object is the specific object.

15. The method of claim 11, wherein receiving a priority assignment set by an occupant of a vehicle includes receiving a priority assignment set by the occupant for an object location, and wherein applying the priority assignment to the object includes applying the priority assignment to the object when the object is in the object location.

16. The method of claim 11, wherein the priority assignment is a priority assignment in a range of priority assignments from lower priority to higher priority, and wherein the distance threshold increases as the priority assignment increases from lower priority to higher priority.

17. The method of claim 11, further comprising:
creating a database of historical data having entries relating an object classification to a priority assignment; and
predicting the priority assignment of a detected object based on the historical data.

18. The method of claim 11, further comprising:
receiving default warning characteristics, wherein receiving a priority assignment includes modifying default warning characteristics according to the classification, and wherein the default warning characteristics include at least one of a warning type, a warning intensity, and a warning location, wherein receiving a priority assignment includes modifying the default warning characteristics based on the priority assignment.

19. The method of claim 11, further comprising:
detecting the object using at least one monocular camera image obtained by a monocular camera mounted to the vehicle; and
determining the distance from the vehicle to the object using a depth map generated based on the at least one monocular camera image.

20. A non-transitory computer-readable medium for an object detection system including instructions that, when executed by one or more processors, cause the one or more processors to:
receive a priority assignment set by an occupant of a vehicle, the priority assignment corresponding to a customization of at least one warning characteristic, the at least one warning characteristic including a distance threshold;
detect an object in an external environment of the vehicle;
classify the object to identify an object classification;
apply the priority assignment to the object based on the object classification; and
issue a warning according to the at least one warning characteristic, wherein according to the distance threshold, the warning is issued when a distance from the vehicle to the object meets the distance threshold.

* * * * *